US00RE45446E

(19) United States
(12) Reissued Patent
Hale, Jr.

(10) Patent Number: US RE45,446 E
(45) Date of Reissued Patent: Apr. 7, 2015

(54) VEHICLE-WHEEL FRONT FACE

(71) Applicant: Mobile Hi-Tech Wheels, Rancho Domniguez, CA (US)

(72) Inventor: Arthur D. Hale, Jr., Long Beach, CA (US)

(73) Assignee: Mobile Hi-Tech Wheels, Rancho Dominguez, CA (US)

(21) Appl. No.: 29/466,658

(22) Filed: Sep. 10, 2013

Related U.S. Patent Documents

Reissue of:
(64) Patent No.: Des. 649,107
Issued: Nov. 22, 2011
Appl. No.: 29/399,812
Filed: Aug. 18, 2011

(51) LOC (10) Cl. ..... 12-16
(52) U.S. Cl.
USPC ..... D12/211
(58) Field of Classification Search
USPC ..... D12/204–213; 301/37.101, 64.101, 301/64.201
See application file for complete search history.

(56) References Cited

U.S. PATENT DOCUMENTS

D348,243 S * 6/1994 Echazabal et al. ..... D12/211
D399,474 S * 10/1998 Stacy ..... D12/211
D410,426 S * 6/1999 Frizzi ..... D12/211
D416,849 S * 11/1999 Weidhase ..... D12/211
D428,379 S * 7/2000 Donikoglu ..... D12/211
D438,163 S * 2/2001 Langerer ..... D12/211
D487,717 S * 3/2004 Lenz ..... D12/211
D527,327 S * 8/2006 Laengerer ..... D12/211
D545,262 S * 6/2007 Southey ..... D12/211
D571,274 S * 6/2008 Chung ..... D12/209
D577,649 S * 9/2008 Ettensberger ..... D12/211
D579,846 S * 11/2008 Chung ..... D12/209
D584,673 S * 1/2009 Chung ..... D12/209
D617,252 S * 6/2010 Zhao ..... D12/211
D618,154 S * 6/2010 Zhao ..... D12/209
D626,487 S * 11/2010 Leng ..... D12/209
D633,028 S * 2/2011 Kim ..... D12/211

* cited by examiner

*Primary Examiner* — Phillip S Hyder
(74) *Attorney, Agent, or Firm* — Christie, Parker & Hale, LLP

(57) CLAIM

The ornamental design for vehicle-wheel front face, as shown and described.

DESCRIPTION

FIG. 1 is a perspective view of a vehicle-wheel front face according to my new design;
FIG. 2 is a front elevational view thereof; and,
FIG. 3 is a side elevational view thereof.
The broken line showing of the rear of the rim is included for the purpose of illustrating environment and forms no part of the claimed design.

1 Claim, 3 Drawing Sheets

Figure 1:
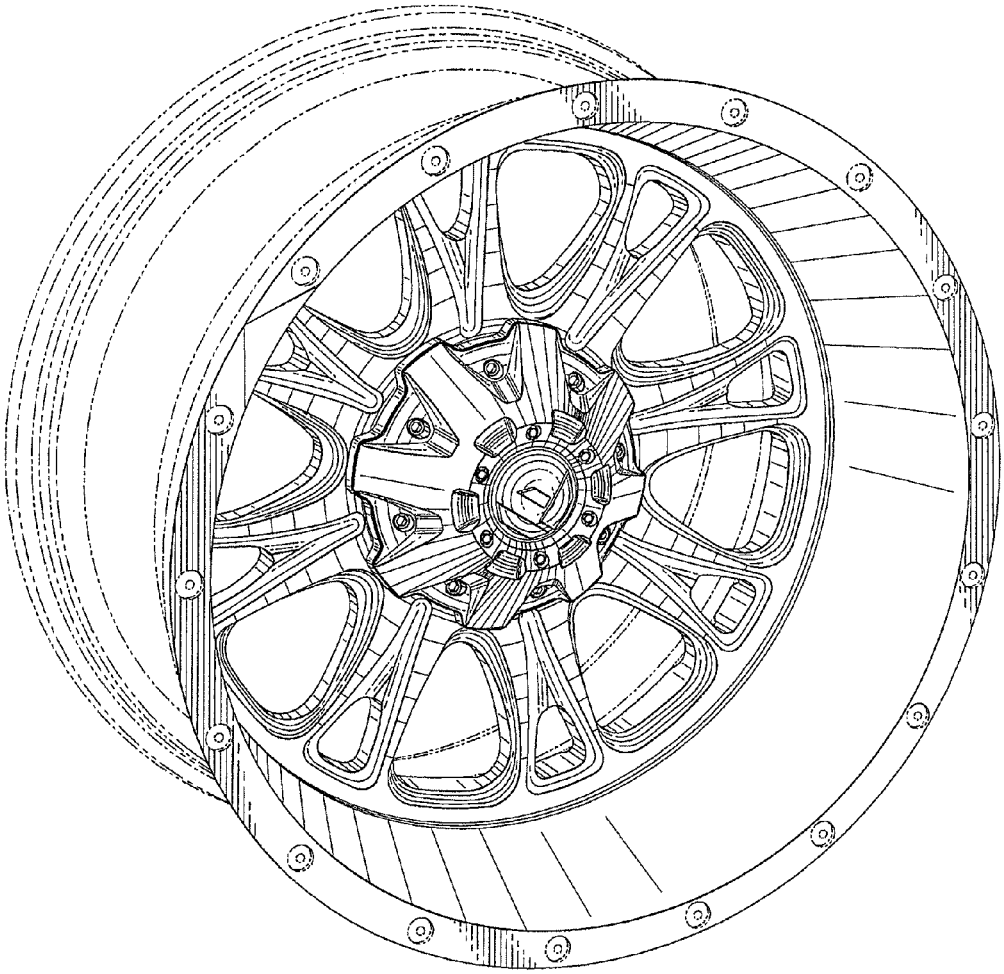
Figure 2:
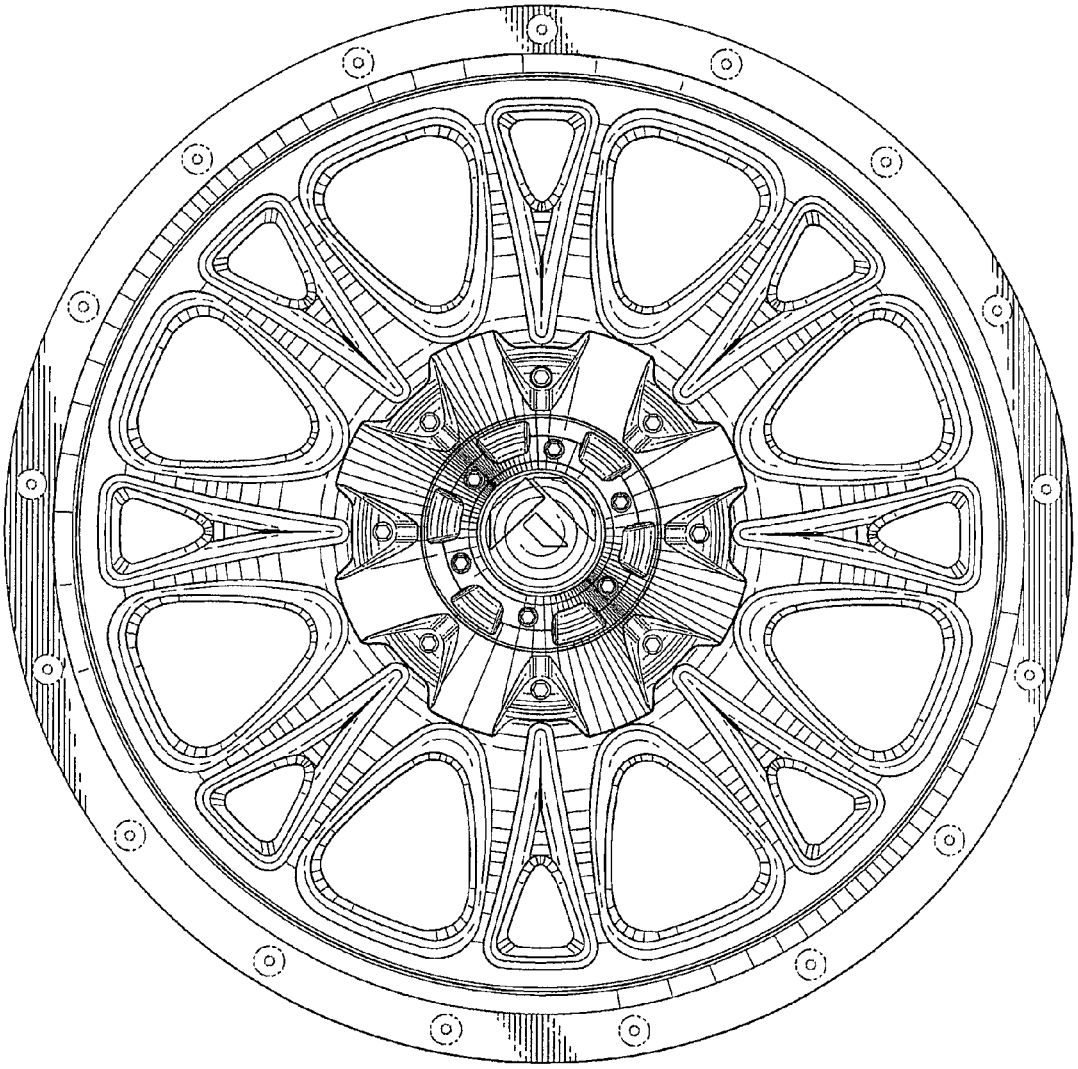
Figure 3:
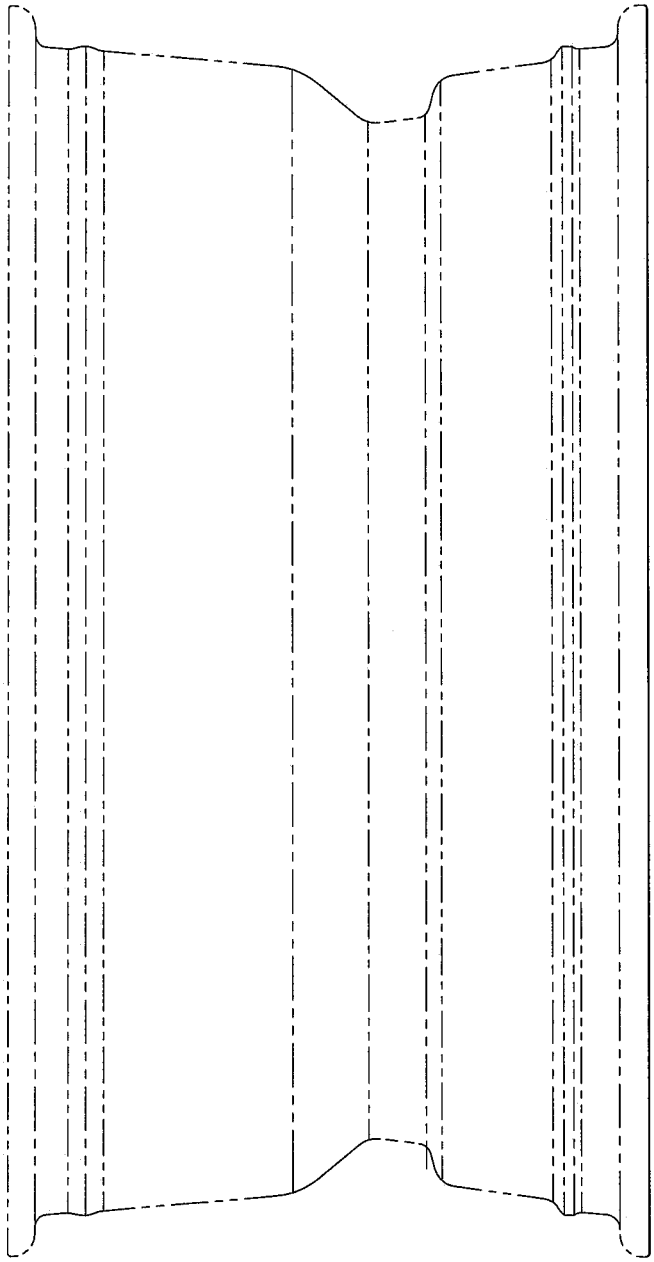

Matter enclosed in heavy brackets [ ] appears in the original patent but forms no part of this reissue; matter printed in italics indicates the additions made by reissue.

AMENDED

AMENDED

AMENDED